United States Patent [19]

Troychak et al.

[11] Patent Number: 5,038,146
[45] Date of Patent: Aug. 6, 1991

[54] ARRAY BUILT IN TEST

[75] Inventors: Joseph A. Troychak, Buellton; Toshikazu Tsukii, Santa Barbara, both of Calif.; Mark M. Doherty, Hudson, N.H.

[73] Assignee: Raytheon Company, Lexington, Mass.

[21] Appl. No.: 571,681

[22] Filed: Aug. 22, 1990

[51] Int. Cl.$^5$ ............................................. H01Q 21/22
[52] U.S. Cl. ...................................... 342/173; 342/165; 342/372
[58] Field of Search ............... 342/173, 175, 165, 372; 343/703, 778; 324/630, 611; 333/101, 33, 21 A, 137

[56] References Cited

U.S. PATENT DOCUMENTS

| | | | |
|---|---|---|---|
| 4,434,397 | 2/1984 | Nelson | 324/58 R |
| 4,532,518 | 7/1985 | Gaglione et al. | 342/372 |
| 4,710,734 | 12/1987 | Sterns | 333/101 |
| 4,857,935 | 8/1989 | Bates | 342/175 X |
| 4,949,090 | 8/1990 | Tamii et al. | 342/173 |
| 4,951,060 | 8/1990 | Cohn | 342/175 |

Primary Examiner—Mark Hellner
Attorney, Agent, or Firm—Richard M. Sharkansky; Edmund J. Walsh

[57] ABSTRACT

Built in test circuitry for an array transmitter. The circuitry includes a directional coupler with directivity equal to the mutual coupling between adjacent antenna elements. The direct input port of the coupler is connected to the antenna element and the direct output port of the coupler is connected to the circuitry generating the signal transmitted by the antenna element. The coupled port of the coupler feeds a detector which in turn provides an input to a control circuit. This circuit can be controlled to test, for each antenna element, the RF power driving each antenna element, the effective power radiated from each element, and the operation of the phase shifter coupled to each antenna element.

13 Claims, 3 Drawing Sheets

ARRAY BUILT IN TEST

The Government has rights in this invention pursuant to Contract No. N00019-88-C-0218 awarded by the Department of the Navy.

BACKGROUND OF THE INVENTION

This invention relates generally to antenna arrays and more particularly to apparatus for testing active antenna arrays.

As technology improves, electrical systems become more and more complicated. This complexity makes it difficult to know if the system is operating properly and to diagnose failures. To make systems more maintainable, built in test (or "BIT") circuitry has been added to systems. The BIT circuitry monitors the operation of the system and reports when failures occur.

An inherent limitation of BIT circuitry is that the BIT circuitry adds further complexity to the system. If the BIT circuitry is too complicated, it can make the system harder, rather than easier, to maintain. For example, there would be no benefit to adding three components of BIT circuitry, each having a mean time between failures of 100 hours, to test a component with a mean time between failures of 50 hours. If the BIT circuitry indicated a failure, it would more likely be due to a failure in the BIT circuit than in the component being tested. Accordingly, it is desirable for BIT circuitry to be as simple as possible.

One system in which BIT could be of benefit is a phased array transmitter. BIT circuitry for such systems has generally been limited to measuring the level of the signal applied to each antenna element. This signal level can be easily measured by coupling a portion of the signal at the input of the antenna element to a test circuit which measures its level.

Measuring the level of the signal at the input of the antenna provides useful information about a transmitter system. However, to more fully check the operation of the transmitter, other measurements can be taken. For example, it is important to know the effective radiated power (ERP) from any antenna element. Additionally, in a phased array system, it is important to check the operation of phase shifters used to control the phase of the signal transmitted from each antenna element.

SUMMARY OF THE INVENTION

With the foregoing background of the invention in mind, it is an object of this invention to provide BIT circuitry for a transmitter with a phased array antenna.

It is a further object to provide BIT circuitry for a transmitter which requires few added components.

It is yet another object to provide BIT circuitry for a transmitter with a phased array antenna which can measure effective radiated power and the operation of phase shifters.

The foregoing and other objects are achieved in a transmitter system of the type having a signal coupled through a plurality of signal paths to the elements of an array antenna. Each signal path comprises a controllable phase shifter and a power amplifier. The test circuitry comprises a directional coupler in each signal path between the power amplifier and the antenna element. The directional coupler couples signals from the amplifier to a measurement circuit with relatively high attenuation and from the antenna to the measurement circuit with a relatively low attenuation. The difference between the relatively high and relatively low attenuations is selected to roughly equal the attenuation of a signal transmitted from one element of the antenna array and received at an adjacent element of the array.

BRIEF DESCRIPTION OF THE DRAWINGS

The invention will be understood by reference to the following more detailed description and accompanying drawings in which.

DESCRIPTION OF THE PREFERRED EMBODIMENTS

Figure 1:
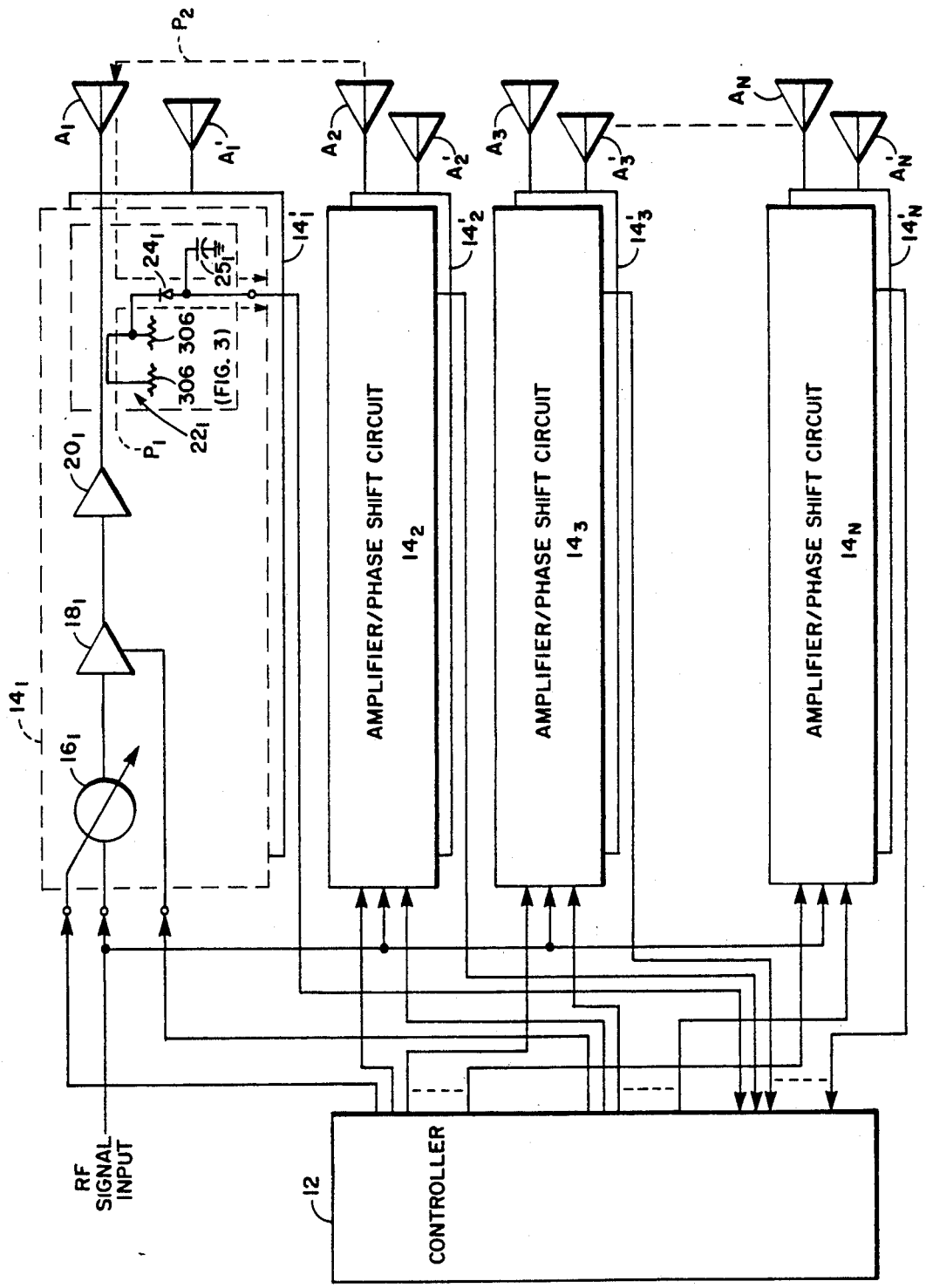
FIG. 1 shows a simplified block diagram of a transmitter with a phased array antenna incorporating the present invention.

FIG. 1 shows a block diagram of a transmitter system 10. One of skill in the art will understand that the blocks shown in FIG. 1 represent well-known elements but are connected and operated in a novel fashion as described below. An RF signal is applied to the RF SIGNAL INPUT and is transmitted from the array antenna comprised of antenna elements $A_1 \ldots A_N$ and $A'_1 \ldots A'_N$. The system of FIG. 1 transmits dual polarization signals. Antenna elements $A_1 \ldots A_N$ are the co-polarization elements and elements $A'_1 \ldots A'_N$ are the cross-polarization elements. As is known, the direction in which the RF signal is transmitted is dictated by the phase of the signal at each of the antenna elements $A_1 \ldots A_N$ and $A'_1 \ldots A'_N$.

The amplitude and phase of the RF signal at each antenna element $A_1 \ldots A_N$ is controlled by amplifier phase shift circuits $14_1 \ldots 14_N$ and $14'_1 \ldots 14'_N$. Amplifier/phase shift circuits $14_1 \ldots 14_N$ and $14'_1 \ldots 14'_N$ are controlled, in a known manner, by controller 12 to ensure that the RF signal is applied to each of the antenna elements $A_1 \ldots A_N$ and $A'_1 \ldots A'_N$ with the required phase.

Each of the amplifier/phase shift circuits $14_1 \ldots 14_N$ and $14'_1 \ldots 14'_N$ is constructed from identical components. The construction and operation of all the phase shift circuits can be understood from the details shown for phase shift circuit $14_1$. Phase shift circuit 14 contains a phase shifter $16_1$ of known construction. The amount of phase shift imparted by phase shifter $16_1$ is dictated by a control input from controller 12.

In series with phase shifter $16_1$ is an adjustable gain amplifier $18_1$ of known construction. Adjustable gain amplifier $18_1$ amplifies the RF signal by an amount dictated by a control input generated by controller 12. Adjustable gain amplifier $18_1$ can also, in response to the input from controller 12, block the passage of the RF signal through the phase shift circuit. This capability allows the RF signal to be applied to only a selected one or ones of the antenna elements $A_1 \ldots A_N$ and $A'_1 \ldots A'_N$.

After adjustable gain amplifier $18_1$, the RF signal passes to a power amplifier $20_1$ of known construction. The output of power amplifier $20_1$ is connected to directional coupler 22.

Figure 2A:
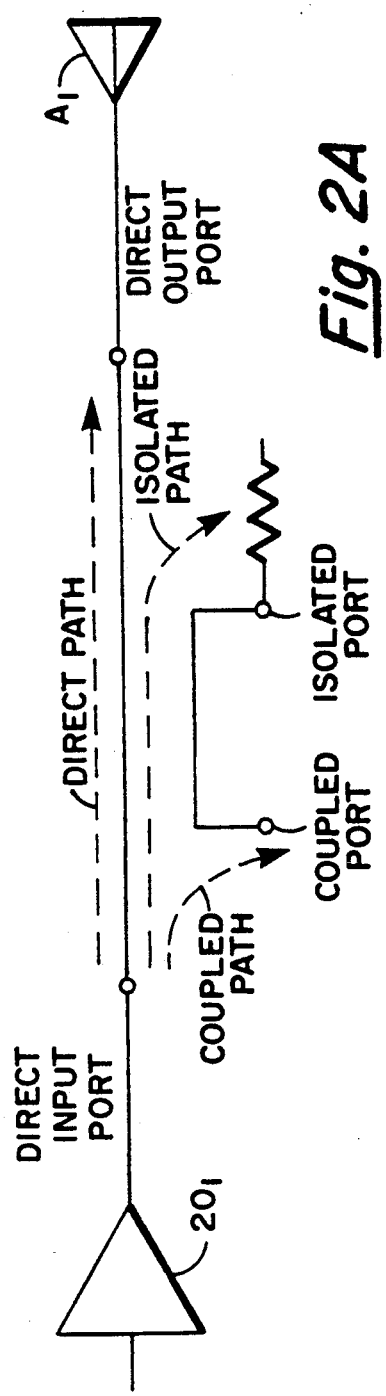
FIG. 2A shows a directional coupler as connected in prior art devices.

FIG. 2A shows a directional coupler configured as in prior art systems which is useful in understanding the ports of the directional coupler $22_1$. The directional coupler is a four port device, with the ports commonly called: the direct input port, the direct output port, the coupled port, and the isolated port. The bulk of any RF signal at the direct input port follows the direct path and appears at the direct output port. A small portion of the signal at the direct input port follows the coupled path and appears at the coupled port. Much less of the signal follows the isolated path to appear at the isolated port.

If the signal were applied at the direct output port, the coupled port would act as an isolated port. Much less of the signal from the direct output port would appear at the coupled port than at the isolated port. Accordingly, when input signals are applied to both the direct input port and the direct output port, and the output signal is taken at the coupled port, the signal from the direct input port appears at the output at a much higher level than the signal from the direct output port. The difference in the levels of these signals is called the directivity of the coupler. The directivity of a coupler is set by adjusting known parameters of the coupler design.

As shown in FIG. 2A, prior art systems configured the directional coupler with the direct input port connected to a power amplifier $20_1$ and the direct output port connected to an antenna element $14_1$. With these connections, the signal at the coupled port was essentially a portion of the signal out of power amplifier $20_1$. Because of the directivity of the coupler and because received signals are usually of much lower amplitude than transmitted signals, the contributions from signals at the direct output port were negligible at the coupled port.

Figure 2B:
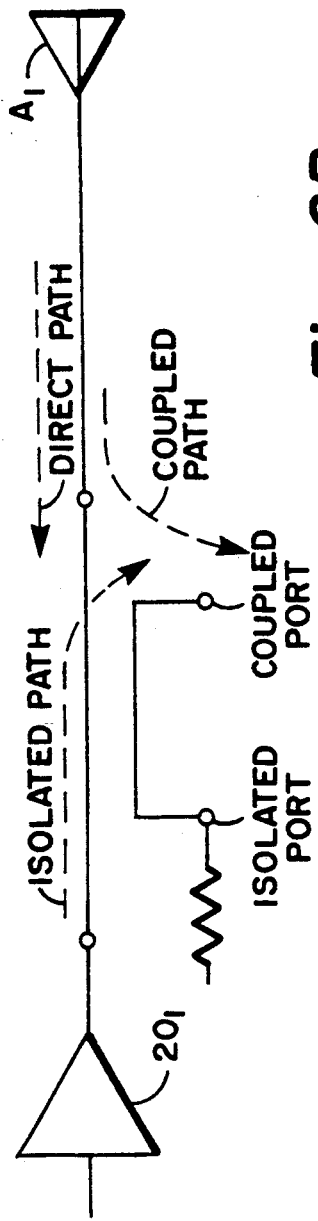
FIG. 2B shows a directional coupler as connected in the invention.

FIG. 1 and FIG. 2B shows that, for the invention, directional coupler $22_1$ is connected opposite than in the prior art. The direct input port is connected to antenna element $14_1$ and the direct output port is connected to power amplifier $20_1$. The coupled port is connected to detector $24_1$. The signals applied to detector 24 are available to controller 12. Controller 12 can thus perform BIT functions, in a manner described in greater detail below, based on the value of the signal at detector $24_1$. Suffice it to say here that controller 12 contains circuitry, of known construction, for comparing the levels of various signals and producing an indication of a fault when the results of the comparisons fall outside of predetermined ranges.

Here, the directivity of directional coupler $22_1$ is selected to allow several BIT functions to be performed. In particular, the directivity of directional coupler $22_1$ is equal to the attenuation along path $P_2$ through antenna element $A_2$ into antenna $A_1$ and to directional coupler $22_1$. This attenuation is sometimes called the "mutual coupling" between adjacent antenna elements.

Because of this choice of directivity, signals along path $P_1$ and $P_2$ will reach detector $24_1$ with roughly the same signal level. Thus, the built in test circuitry does not need excessive dynamic range to test both the power levels of signals out of power amplifier $20_1$ and the power levels of signals radiated from antenna element $A_2$.

To test that adjustable amplifier $18_1$ and power amplifier $20_1$ are working properly, adjustable amplifiers in amplifier/phase shift circuits $14_2 \ldots 14_N$ and $14'_1 \ldots 14'_N$ are turned off so that no signals are radiated from antenna elements $A_2 \ldots A_N$ and $A'_1 \ldots A'_N$. The signal at detector $24_1$, thus, represents the signal out of power amplifier $20_1$. Since the output of detector $24_1$ is connected to controller 12, controller 12 can check that the signal out of power amplifier $20_1$ has the appropriate level. Controller 12 can also generate commands to change the gain of adjustable amplifier $18_1$ and verify that the measured signal level changes appropriately. In this way, the operation of adjustable amplifier $18_1$ and power amplifier $20_1$ can also be tested.

Knowing that a signal with the appropriate signal level is generated by power amplifier $20_1$ does not assure that the signal is being transmitted with the desired effective radiated power (ERP). To test the ERP of the signal from any antenna element, the adjustable amplifier 18 in the amplifier/phase shift circuit connected to that antenna element is turned on and all other adjustable amplifiers are turned off. The signal at the detector 24 in an adjacent amplifier/phase shift circuit is then measured by controller 12 to verify that it has the correct level. For example, to check the ERP of antenna element $A_2$, a signal is passed through amplifier/phase shift circuit $14_2$ and transmitted from antenna element $A_2$. That signal propagates along path $P_2$ to detector $24_1$. Since adjustable amplifier $18_1$ is turned off, no signal travels along path $P_1$. Thus, the signal passed to controller 12 through detector $24_1$ tells the ERP of antenna element $A_2$.

The foregoing tests checked power levels only. The phase of signals is also important and phase shifters 16 should be tested for a comprehensive test of transmitter system 10. To test phase shifter $16_2$, adjustable amplifier $18_1$ is turned on as is the adjustable amplifier in the adjacent phase shift circuit $14_2$. The adjustable amplifiers in amplifier/phase shift circuits $14_3 \ldots 14_N$ and $14'_1 \ldots 14'_N$ are turned off. Signals arrive at detector $24_1$ through both paths $P_1$ and $P_2$. With the appropriate selection of directivity of directional coupler $22_1$ as described above, these signals have approximately the same magnitude. The signals in paths $P_1$ and $P_2$ are combined in directional coupler $22_1$. If the signals are in phase, the magnitude of the signal at detector $24_1$ will be roughly twice the level of either signal alone. As the phase difference between the signals in paths $P_1$ and $P_2$ increases, the signal at detector $24_1$ will get smaller. Thus, to test phase shifter $16_2$, controller 12 sends commands to phase shifter $16_2$ to change the phase of the signal in path $P_2$. Controller 12 then monitors the signal out of detector $24_1$ to verify that the level is changing as would be expected if the phase of the signal in path $P_2$ were changing as commanded by controller 12.

Figure 3:
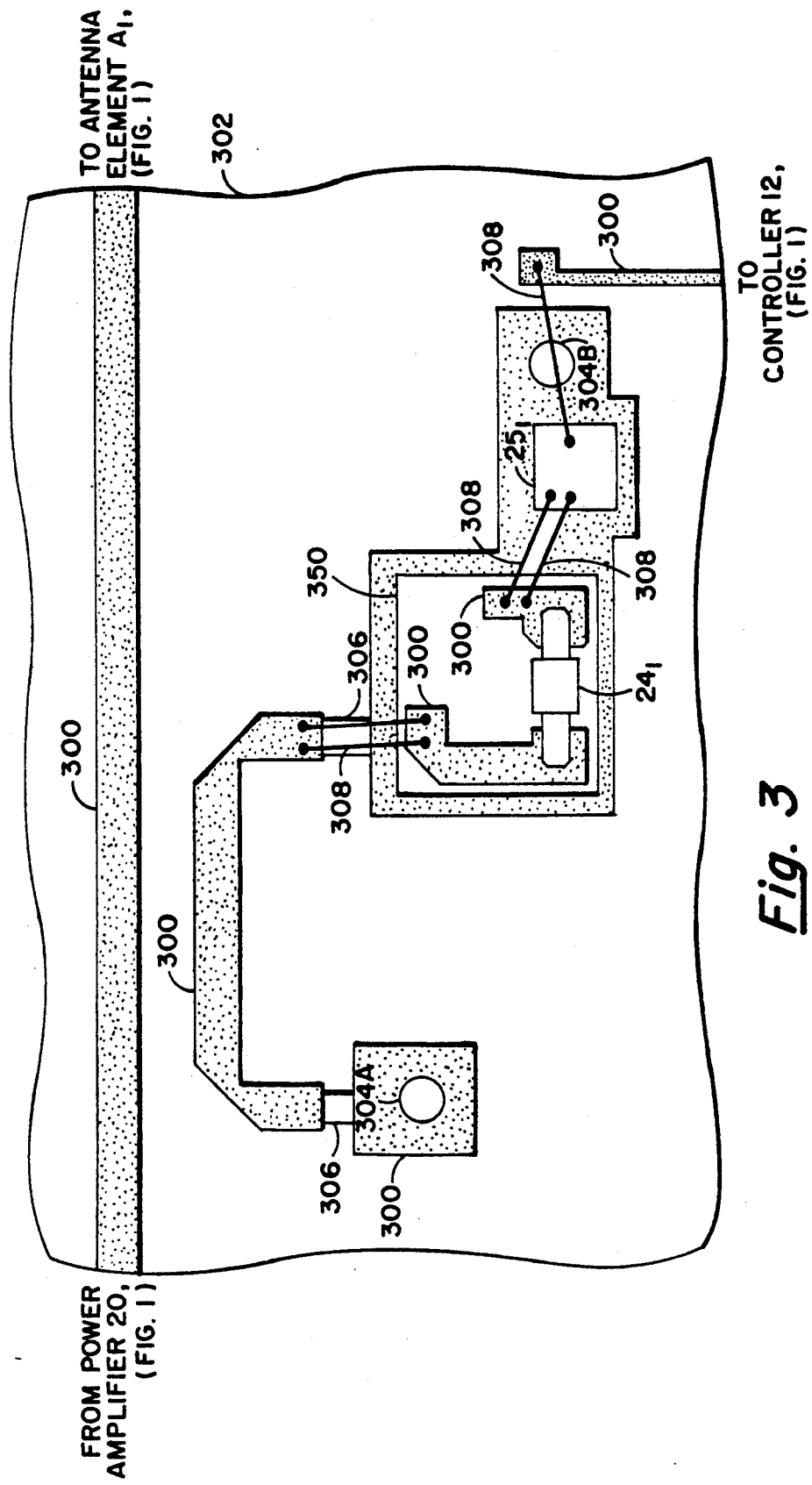
FIG. 3 shows a MMIC layout of the test circuitry shown in FIG. 1.

FIG. 3 shows details of the fabrication of a directional coupler. Here, the circuit is implemented using MIC technology. Metal traces 300 are disposed on substrate 302. The metal traces 300 and other components are connected with wire bonds 308. Fifty ohm terminators 306 are connected to ground through via holes 304A and 304B, which passes through the substrate. Capacitor $25_1$, which acts as a filtering capacitor, is connected to ground through via hole 304B.

Detector $24_1$ is implemented as a beam lead detector diode. The leads of detector $24_1$ are connected to metal traces 300 in substrate 302. For ease of manufacturing, it is sometimes better to connect detector $24_1$ to metal traces on a substrate layer 350. The substrate layer can then be mounted to substrate 302.

A method of testing amplifier output, ERP, and phase of a signal coupled to one antenna element has been described. The same parameters can be tested in like fashion for any other antenna element. It will also be appreciated that providing signals from adjacent antenna elements with roughly the same strength to a detector allows many other tests to be performed. Controller 12 might contain a microprocessor which could be programmed to perform other tests or which could be programmed to perform tests in a different order than described here.

One of skill in the art will also appreciate that many alterations could be made to the disclosed embodiment without departing from the invention. For example, for clarity, the outputs of all the detectors in all of the phase shift circuits are shown going directly to controller 12. For implementation convenience, it might be preferable to have all the outputs of the detectors going to a multiplexer and having only the output of one detector selected by the multiplexer for application to controller 12. Also, FIG. 1 shows analog outputs of detector 24 passing directly to controller 12. It might be advantageous to convert the output of the detectors to digital form using an analog to digital converter. As another example, the tests involving adjacent antenna elements used adjacent co-polarization elements. A co-polarization element could also be tested with an adjacent cross-polarization element. In some instances, it will be desirable to perform the test in this fashion. If, for instance, a test determines that amplifier/phase shift circuit $14_1$ is not producing the correct output power, it would be desirable not to use amplifier/phase shift circuit $14_1$ in the test of a phase shifter in amplifier/phase shifter $14_2$. Rather, it would be desirable to use amplifier/phase shifter circuit $14'_1$ to test amplifier/phase shifter circuit $14_2$. It is felt, therefore, that this invention should be limited only by the spirit and scope of the appended claims.

What is claimed is:
1. Apparatus comprising:
   a) an antenna having at least two antenna elements, each having a signal port;
   b) at least two means each for producing an RF signal, each means coupled to the signal port of one of the at least two antenna elements;
   c) a directional coupler having a direct input port and a direct output port and a coupled port, said directional coupler having its direct input port connected to the signal port of one of the antenna elements and its direct output port connected to one of the means for producing an RF signal; and
   d) means for observing the signal level at the coupled port of the directional coupler.
2. The apparatus of claim 1 wherein each of the plurality of means for producing an RF signal comprises means for inhibiting the means from producing a signal in response to a control signal.
3. The apparatus of claim 2 wherein the directional coupler has a directivity equal to the mutual coupling between the two antenna elements.
4. The apparatus of claim 3 wherein the means for producing an RF signal comprises a phase shifter in a series path with a power amplifier.
5. The apparatus of claim 4 wherein the means for inhibiting comprises an adjustable gain amplifier.
6. The apparatus of claim 5 wherein the means for observing comprises:
   a) a detector coupled to the coupled port of the directional coupler; and
   b) logic means coupled to the output of the detector.
7. The apparatus of claim 6 wherein the logic means comprises:
   a) means for controlling the phase introduced by the phase shifter; and
   b) means for controlling the gain of the amplifier.
8. A method of testing a system for transmitting RF signals of the type having an array antenna with a plurality of elements with a phase shift circuit connected to each antenna element, the method comprising the steps of:
   a) measuring the strength of a signal comprising the combination of the signal applied to a first antenna element for transmitting and the signal transmitted by a second antenna element as received at the first antenna element;
   b) changing the phase of a signal applied to one of the antenna elements; and
   c) repeating the step of measuring and comparing the change of signal strength with a known value.
9. The method of claim 8 wherein the step of measuring the combination of signals comprises:
   a) attenuating the signal applied to the first antenna element by a first predetermined amount;
   b) attenuating the signal as received at the first antenna by a second predetermined amount to form a first attenuated signal, wherein the first predetermined amount exceeds the second predetermined amount to form a second attenuated signal; and
   c) combining the first attenuated signal and second attenuated signal to form the combined signal.
10. The method of claim 9 wherein the difference between the first predetermined amount and the second predetermined amount equals the attenuation of a signal transmitted by the second antenna element as received at the first antenna element.
11. The method of claim 10 wherein the steps of attenuating the signal applied to the first antenna element and attenuating the signal received at the first antenna element comprises coupling the signals through a directional coupler.
12. The method of claim 8 additionally comprising the step of:
   a) measuring the strength of the signal applied to the first antenna element; and
   b) comparing the measured signal strength to a predetermined value.
13. The method of claim 12 additionally comprising the steps of:
   a) measuring the strength of the signal transmitted by the second antenna element as received at the first antenna element; and
   b) comparing the strength of the measured signal to a predetermined value.

* * * * *